April 7, 1970 A. GABOR 3,505,661

RANDOM ACCESS MEMORY WITH PLURALITY OF TAPE CARTRIDGES

Filed March 21, 1966 12 Sheets-Sheet 1

INVENTOR

Andrew Gabor

BY

Lane, Aitken, Dunner & Ziems

ATTORNEYS

INVENTOR
Andrew Gabor

BY
Lane, Aitken, Dunner & Ziems
ATTORNEYS

April 7, 1970 A. GABOR 3,505,661

RANDOM ACCESS MEMORY WITH PLURALITY OF TAPE CARTRIDGES

Filed March 21, 1966 12 Sheets-Sheet 3

INVENTOR
Andrew Gabor

BY Lane, Aitken, Dunner & Ziems
ATTORNEYS

INVENTOR
Andrew Gabor

BY
Lane, Aitken, Dunner & Ziems
ATTORNEYS

April 7, 1970 A. GABOR 3,505,661

RANDOM ACCESS MEMORY WITH PLURALITY OF TAPE CARTRIDGES

Filed March 21, 1966 12 Sheets-Sheet 5

INVENTOR
Andrew Gabor

BY Lane, Aitken, Dunner & Ziems
ATTORNEYS

April 7, 1970 A. GABOR 3,505,661

RANDOM ACCESS MEMORY WITH PLURALITY OF TAPE CARTRIDGES

Filed March 21, 1966 12 Sheets-Sheet 6

INVENTOR
Andrew Gabor

BY Lane, Aitken, Dunner & Ziems
ATTORNEYS

RANDOM ACCESS MEMORY WITH PLURALITY OF TAPE CARTRIDGES

Filed March 21, 1966 12 Sheets-Sheet 7

INVENTOR
Andrew Gabor

BY
Lane, Aitken, Dunner & Ziems
ATTORNEYS

RANDOM ACCESS MEMORY WITH PLURALITY OF TAPE CARTRIDGES

Filed March 21, 1966 12 Sheets-Sheet 8

INVENTOR
Andrew Gabor

BY Lane, Aitken, Dunner & Ziems
ATTORNEYS

RANDOM ACCESS MEMORY WITH PLURALITY OF TAPE CARTRIDGES

Filed March 21, 1966 12 Sheets-Sheet 9

INVENTOR
Andrew Gabor
BY Lane, Aitken, Dunner & Ziems
ATTORNEYS

INVENTOR
Andrew Gabor

BY
Lane, Aitken, Dunner & Ziems
ATTORNEYS

INVENTOR.
Andrew Gabor
BY
Lane, Aitken, Dunner & Ziems
ATTORNEYS

RANDOM ACCESS MEMORY WITH PLURALITY OF TAPE CARTRIDGES
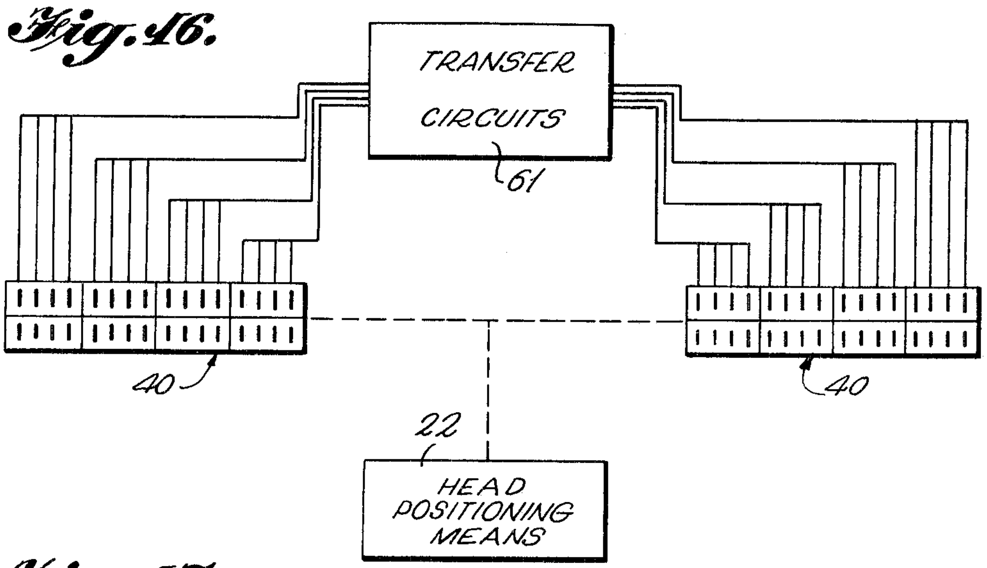
Fig. 17.
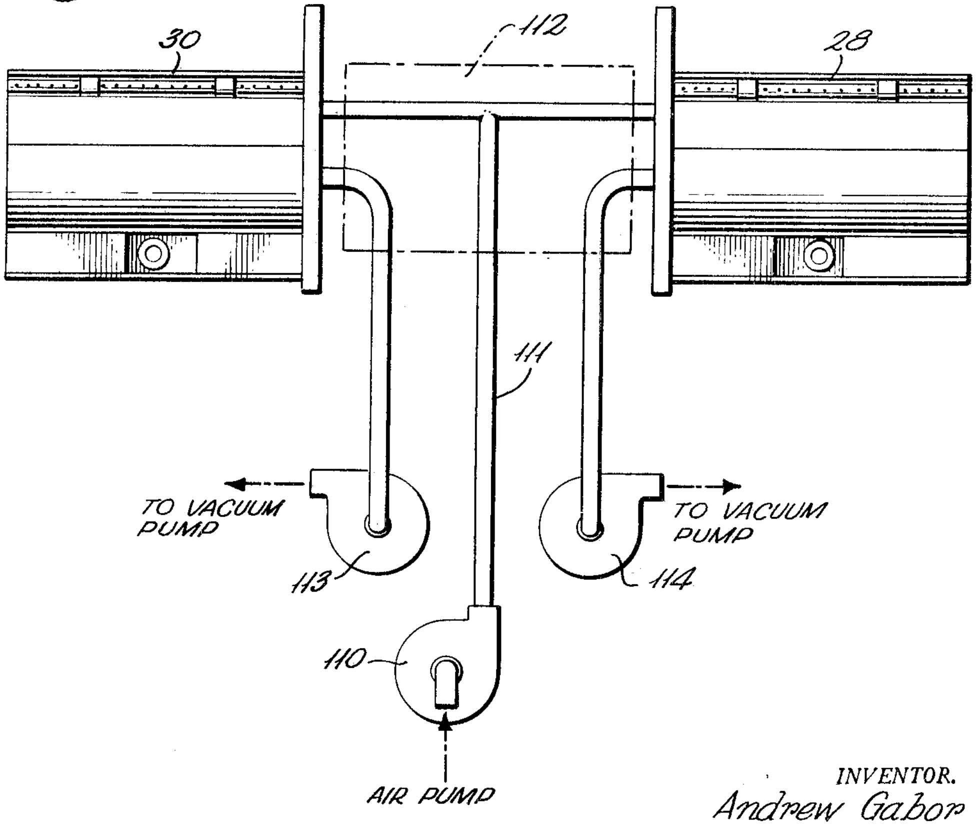
INVENTOR.
Andrew Gabor
BY
Lane, Aitken, Dunner & Ziems
ATTORNEYS United States Patent Office 3,505,661
Patented Apr. 7, 1970

3,505,661
RANDOM ACCESS MEMORY WITH PLURALITY OF TAPE CARTRIDGES

Andrew Gabor, Huntington, N.Y., assignor to Potter Instrument Company, Inc., Plainview, N.Y., a corporation of New York Filed Mar. 21, 1966, Ser. No. 535,747
Int. Cl. G11b *5/00*
U.S. Cl. 340—174.1 6 Claims

ABSTRACT OF THE DISCLOSURE

This specification discloses a random access memory in which endless tape loops are stored in interchangeable cartridges, each of the cartridges containing a plurality of tape loops. A chassis is provided to mount two of the cartridges simultaneously and head positioning means is provided to move transducing head assemblies to register with different tracks on the different tape loops in each of the two cartridges mounted on the chassis. The information stored on the tape loops in one of the cartridges can be transferred to corresponding tracks in the tape loops stored in the other cartridge.

This invention relates to magnetic storage devices and more particularly, it concerns magnetic tape random access memory apparatus.

The present invention is related to the invention disclosed in copending application Ser. No. 385,727, now Patent No. 3,378,826, filed July 28, 1964 by Andrew Gabor and assigned to the assignee of the present invention. Generally, the invention disclosed in this copending application relates to a storage apparatus by which information is stored on a plurality of magnetic tape loops carried in a cartridge which is interchangeable with other cartridges containing additional tape loops. The tape loops of the cartridge, in use, are selectively driven relative to a transducing head assembly which, in turn, is selectively positionable so that transducer heads carried thereon are registered with information tracks on the respective tape loops.

The present invention embodies many of the features of the invention of the aforementioned copending application, but includes additional refinements or improvements by which increased facility and capacity for information storage operations are provided. Among the objects of the present invention are: the provision of an information storage apparatus by which information may be transferred from one multi-tape cartridge to another such cartridge; the provision of an improved transducer head assembly for apparatus of the type aforementioned; the provision of improved transducer head positioning means; and the provision of improved tape positioning and drive means.

Other objects and further scope of applicability of the present invention will become apparent from the detailed description to follow taken in conjunction with the accompanying drawings in which:

FIG. 16 is a schematic view illustrating the interconnection of the transducer head assemblies of this invention; and FIG. 17 is a schematic view depicting the manner of supplying air to and withdrawing air from the drive blocks of this invention.

Figure 1:
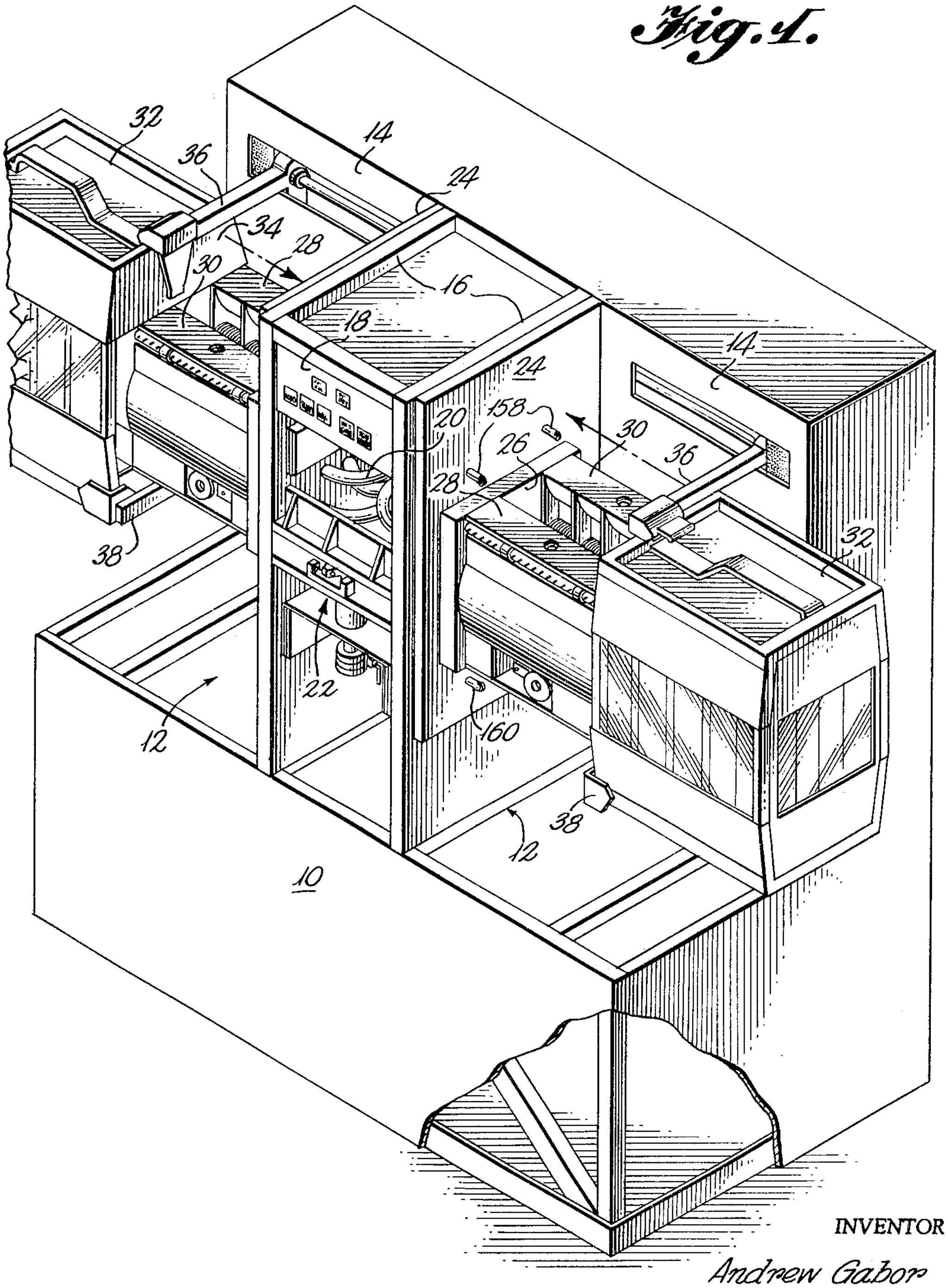
FIG. 1 is a perspective view of the information storage apparatus of this invention.
Figure 2:
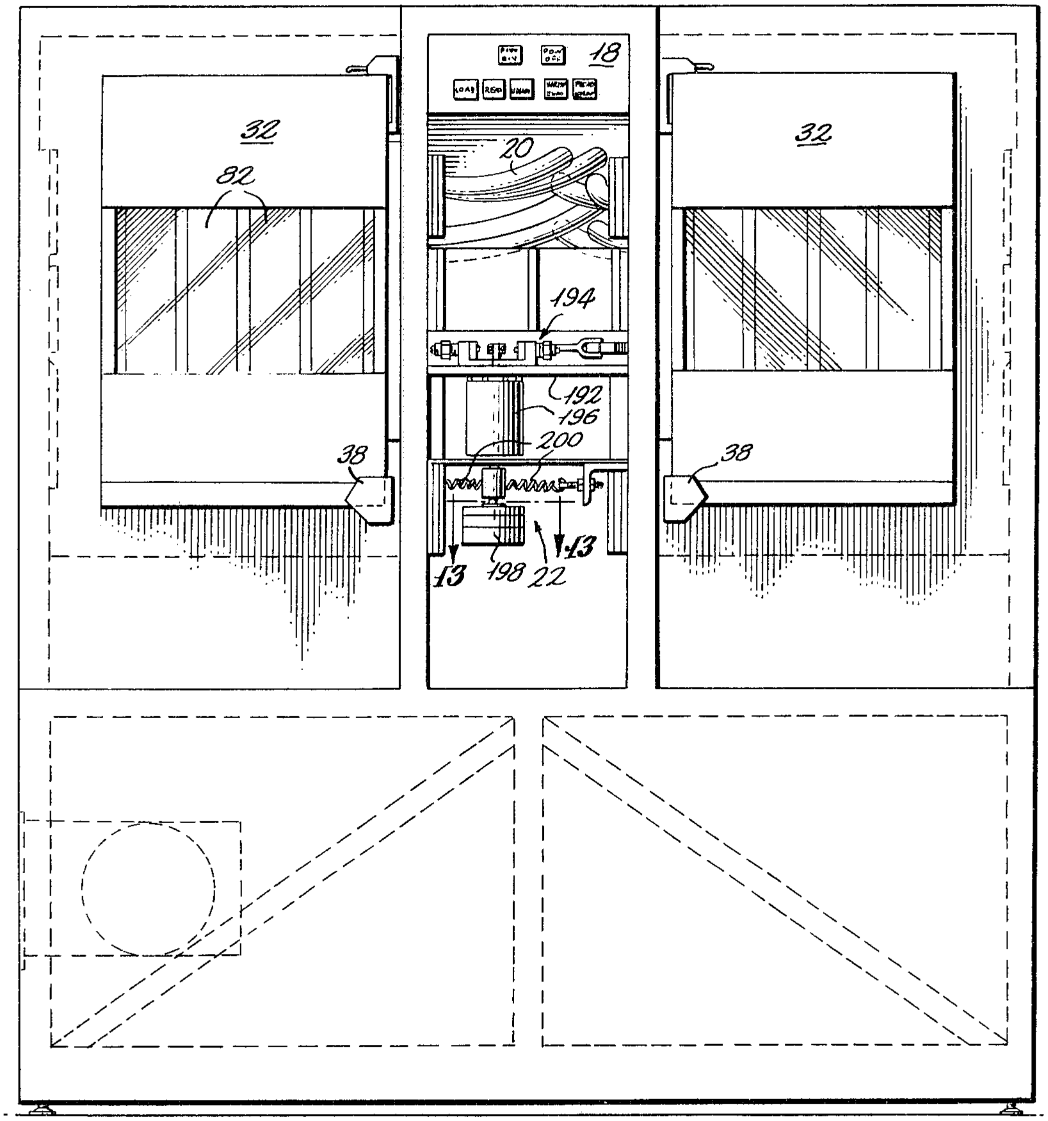
FIG. 2 is a front elevation of the storage apparatus illustrated in FIG. 1.

As shown in the drawings, and particularly FIGS. 1 and 2 thereof, the random access memory apparatus of this invention includes generally a frame or chassis 10 having a pair of cartridge receiving, transducing bays 12, each defined by rear walls or panels 14 and forwardly extending side walls 16 spaced to receive a control panel 18, air lines 20 and a head positioning assembly designated generally by the reference numeral 22. The bays 12 and the transducing apparatus positioned in each of the bays are identical. Each bay, therefore, includes an apron 24 in the form of a rectangular plate to which is fixed a drive block mounting plate 26 for removably supporting a pair of drive blocks 28 and 30. A pair of tape cartridges 32 each having an opening in its front wall 34 are adapted to be supported by upper and lower arms 36 and 38, respectively, of a cartridge feed assembly illustrated most clearly in FIG. 9 of the drawings, and carried simultaneously to an operative transducing position (see FIGS. 2, 4 and 5, for example) on the drive blocks 28 and 30.

Figure 4:
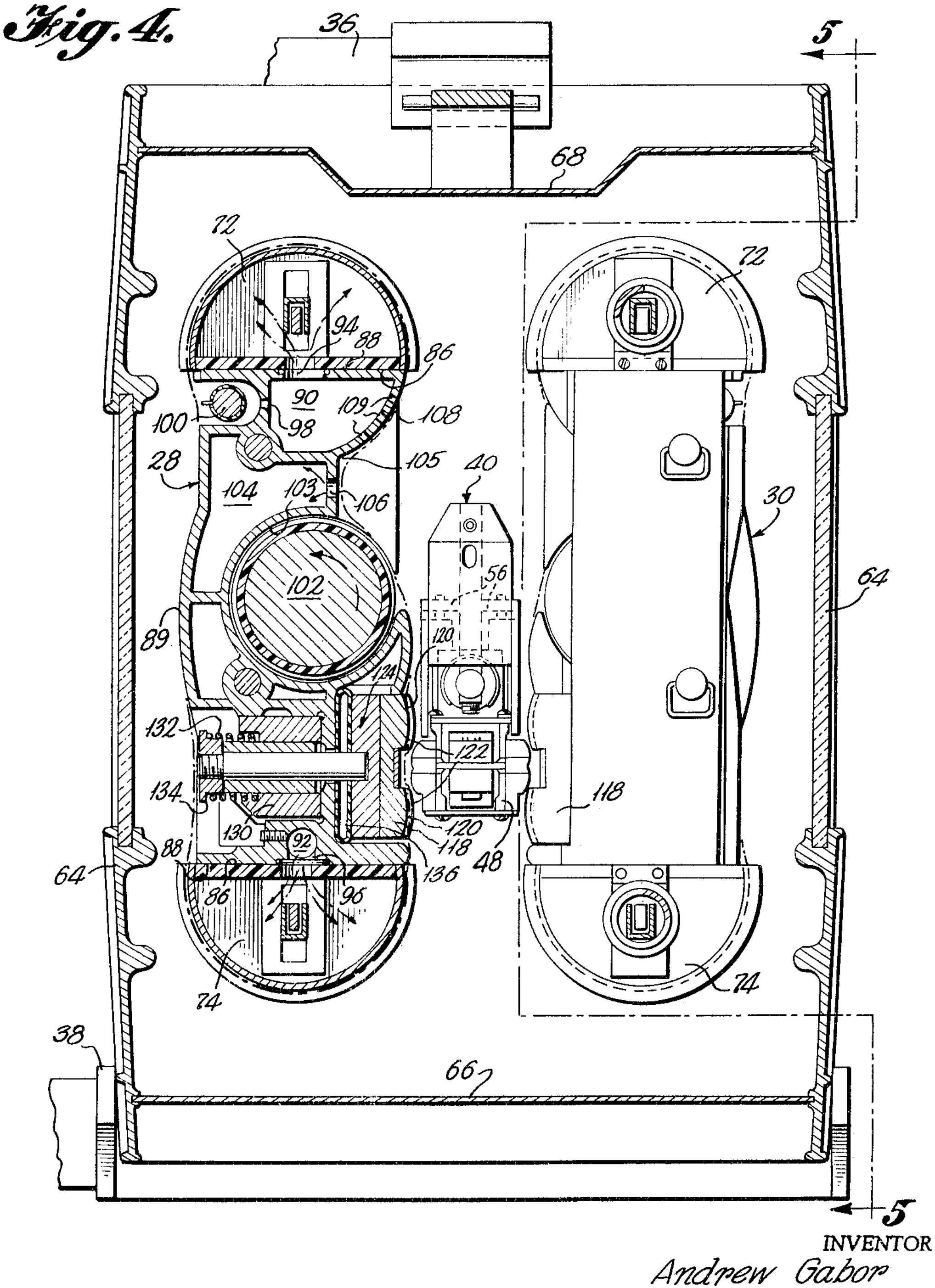
FIG. 4 is a fragmentary cross-section illustrating the multi-tape cartridge for the storage apparatus of this invention in position for transducing operations.
Figure 5:
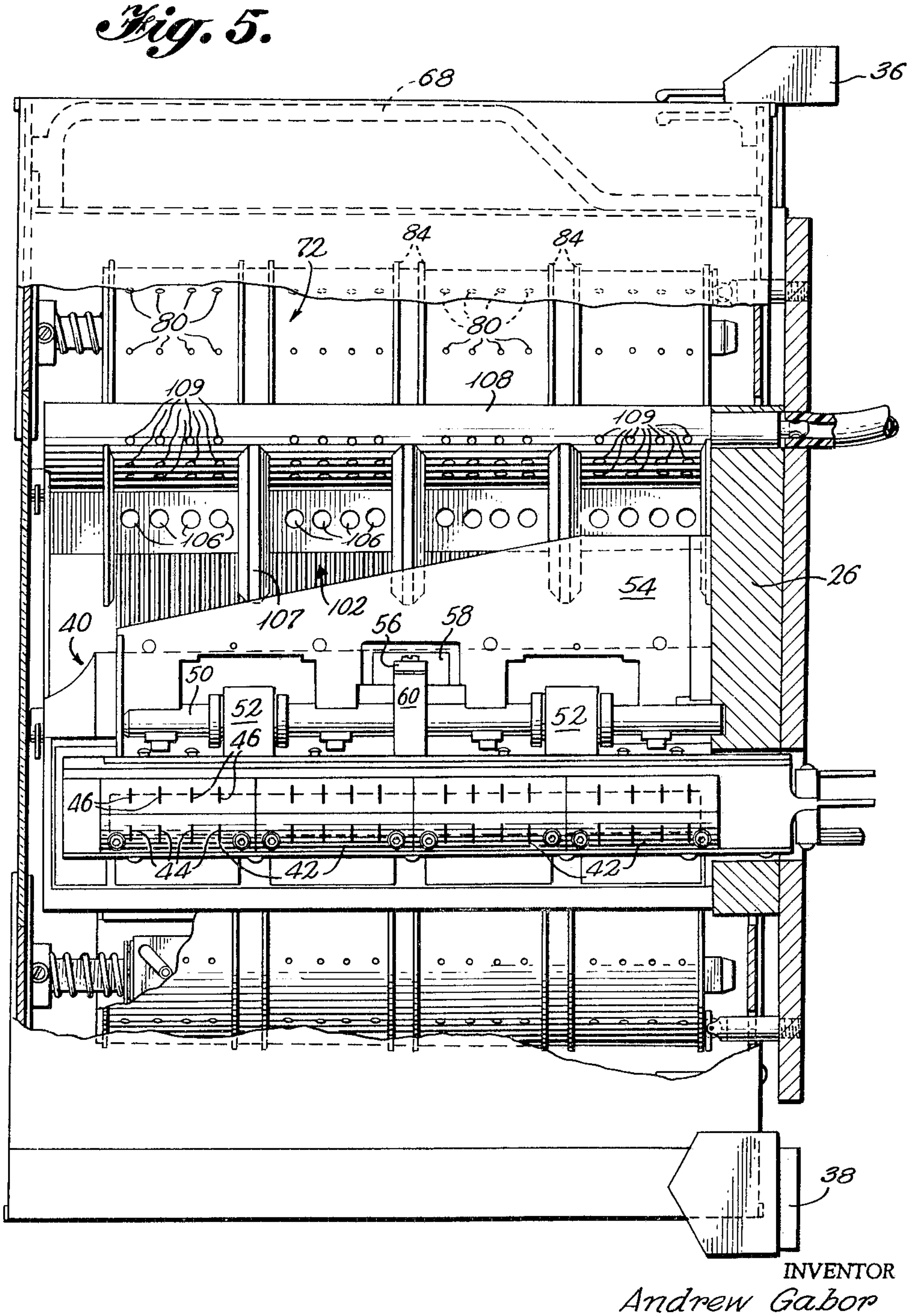
FIG. 5 is a fragmentary side elevation in partial cross-section taken on line 5—5 of FIG. 4.
Figure 6:
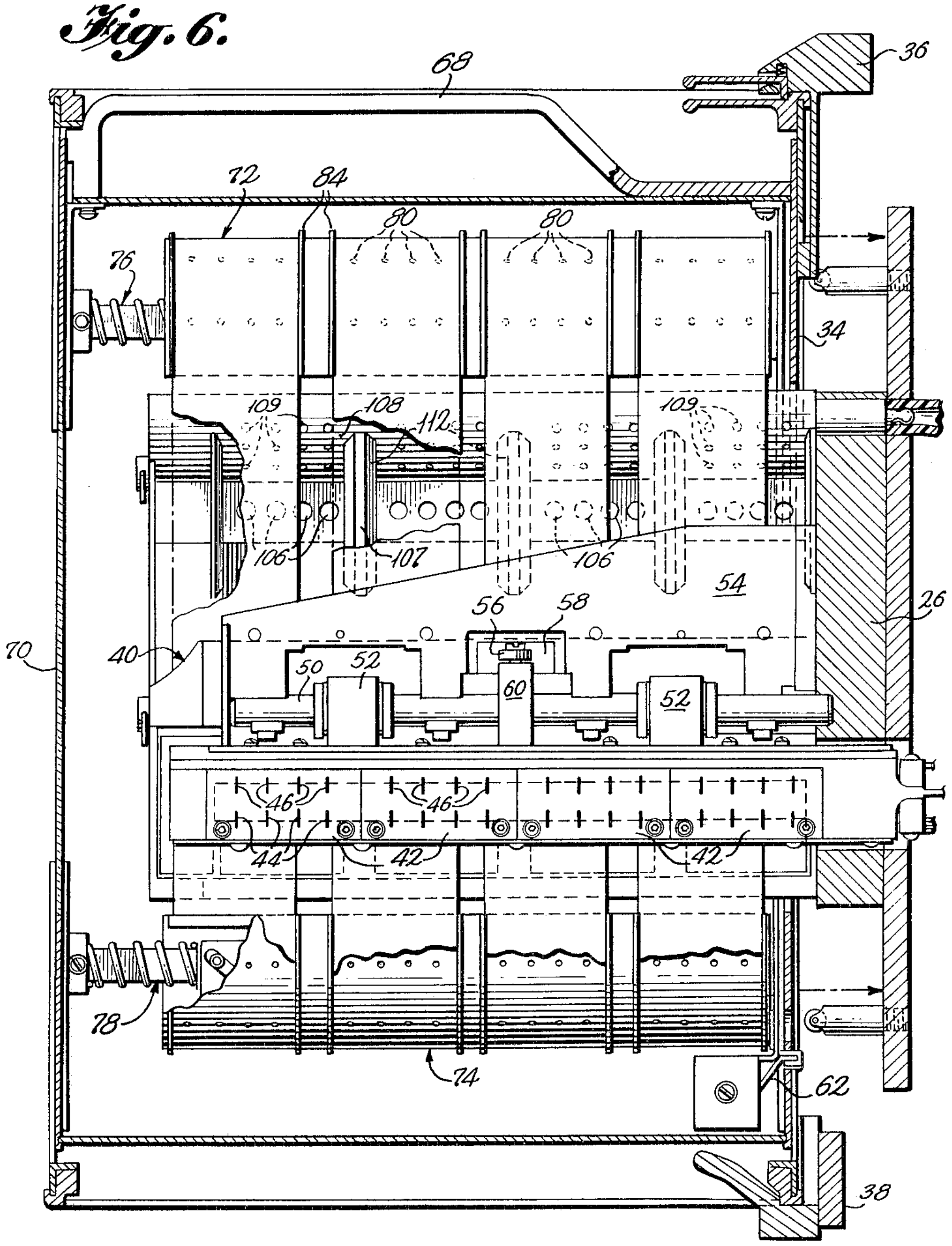
FIG. 6 is a cross-section of the cartridge similar to FIG. 5 but illustrating the components thereof in the position assumed relative to the tape drive and transducing head assembly during cartridge loading.

Centrally positioned between the drive blocks 28 and 30 is a selectively positionable transducing head assembly generally designated by the reference numeral 40 in FIGS. 4–6. The head assembly for each transducing bay, in the embodiment shown, includes eight transducing head modules 42, four on each side thereof and facing in opposite directions, each of the modules 42 including four write heads 44 and four read heads 46. As shown in FIG. 4, the head modules 42 are supported on an H-beam 48, which in turn is supported for rectilinear movement on a bar 50 by linear bearings 52, the bar 50 forming part of a head supporting bracket 54 fixed to the mounting plate 26 of each transducing bay 12. Stabilization of the H-beam 48 and thus of the modules 42 about the axis of the bar 50 is provided by a pair of rollers 56 engaging opposite sides of an undercut flat portion 58 provided on each side of the bracket 54, the rollers 56 being journaled on a bracket 60 fixed to the upper edge of the H-beam 48.

A detailed disclosure of the head modules is found in my copending application Ser. No. 535,781, filed concurrently herewith. In accordance with the present invention, however, it will be noted, by reference to FIG. 16, that the assemblies 40 for both bays 12, including the modules 42, are electrically interconnected by transfer circuits 61 and mechanically interconnected by the head positioning means 22. Although the transfer circuits may be located physically, at least in part, in auxiliary equipment to be used with the apparatus of this invention, it will be appreciated that the organization illustrated schematically in FIG. 16 enables the transfer of information from a cartridge in one of the bays 12 to a cartridge in the other of these bays. Moreover, this operation can be accomplished so that the cartridge to which the information is transferred is, in substantially all respects, a duplication of the other cartridge.

As in the invention of copending application Ser. No. 385,727, filed July 28, 1964, the cartridges 32 are identical and interchangeable with others of such cartridges to provide an ultimate storage capacity limited only by the number of cartridges available. In accordance with the present invention, however, the cartridges 32 each comprise a closed receptacle having, in addition to the front wall 34 provided with an opening adapted to be closed by a curtain 62 (see FIG. 6), side walls 64, a bottom wall 66, a top wall 68 and a rear wall 70. A handle 72 is fixed to the top wall 68 and arranged under the upper margin established by the front, side and rear walls as shown in FIG. 4 to facilitate stacking. Positioned in each of the cartridges 32 are two sets of upper and lower turn-arounds 72 and 74, respectively.

Turn-arounds 72 and 74 are supported on rod assemblies 76 and 78 cantilevered from the rear wall 70 of the cartridge, and which include means, to be described in more detail below, for positioning the turn-arounds properly relative to the drive blocks 28 and 30 and the transducer head assembly 40. Each of the turn-arounds are hollow and generally semi-cylindrical in shape. A series of apertures 80, provide an air support for each of four magnetic tape loops 82 appropriately spaced by spacing members 84 suitably fixed to the cylindrical surface of the turn-arounds.

As shown in FIG. 4 of the drawings, mutually facing flat or planar surfaces 86 on the turn-arounds 72 and 74 are adapted to seat against similar flat or planar surfaces 88 at the top and the bottom of each of the drive blocks 28 and 30. To provide a continuous path through which the tapes 82 may be driven relative to the transducing head modules 42 during operation, the drive blocks are shaped to define a series of smooth, merging, curvilinear surfaces as shown in FIG. 4. These surfaces include an arcuate portion 89 to provide stable tape flight characteristics during transducing operations. Also, it will be noted that each of the drive blocks is provided with internal chambers or passages by which air may be directed against or withdrawn from the tape loops 82. Specifically, each of the drive blocks includes an upper air chamber 90 and a lower air passage 92 communicating through apertures 94 and 96, respectively, with complementing apertures opening through the flat surfaces 86 in the turn-arounds 72 and 74. Thus, it will be appreciated that air pressure fed to the chamber 90 and the passage 92 will be directed into the turn-arounds 72 and 74 and pass through the apertures 80 in the circumferential surfaces thereof to support the tape loops 82 on an air cushion. The chamber 90 also communicates through small passages 98 to bleed air over a static discharge rod 100 to neutralize any static electricity that may develop in the tape loops 82 during operation.

A capstan 102 is received within a cylindrical well 103 extending the length of the drive blocks and is adapted to be rotated continuously at speeds commensurate with the desired rate of tape loop feed. The tapes 82, during operation, are drawn against the capstan 102 by withdrawing air from a chamber 104 in communication with vacuum wells 105 through apertures 106. The vacuum walls 105 are established by spacing blocks 107, the capstan 102, and air bearing, arcuate surface 108 to which air may be delivered from the chamber 90 through apertures 109.

Figure 3:
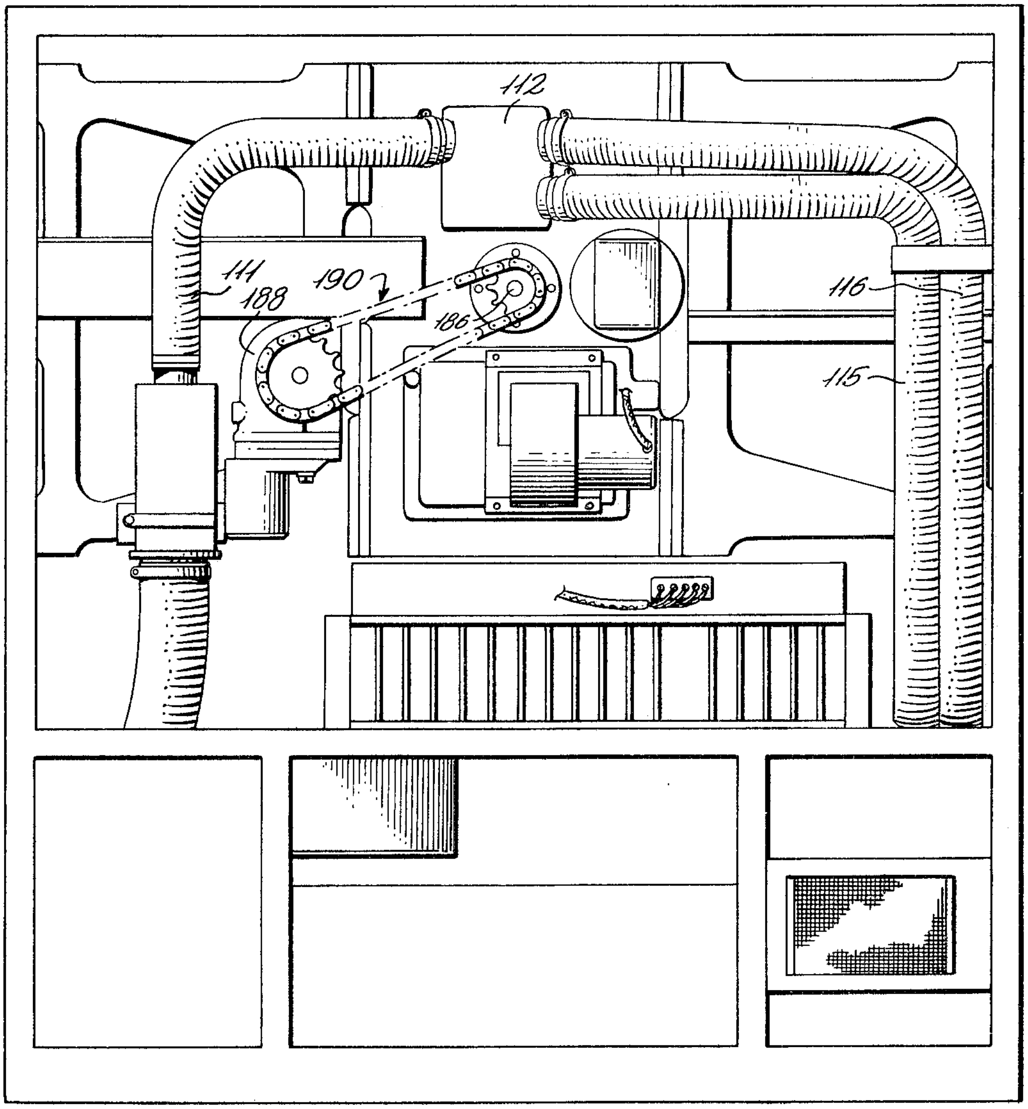
FIG. 3 is a rear elevation of the apparatus of this invention.

As shown in FIGS. 2, 3 and 17, air under pressure is supplied to the chamber 90 and duct 92 in each of the drive blocks 28 and 30 of each transducing bay 12 by an air pump 110, through a duct 111 to a distributor 112. Certain of the hoses 20, connected to the distributor 112, complete the passages for air to be supplied by the pumps 110 to the drive blocks 28 and 30. In accordance with an important feature of this invention, separate vacuum pumps 113 and 114 are connected through separate ducts 115 and 116, the distributor 112 and certain of the hoses 20 to the chambers 104 in the drive blocks 28 and 30 in each of the transducing bays 12. The magnitude of the vacuum applied to the chambers 104 determines the force under which the tapes 82 are drawn against the capstans 102 and thus, in part, the velocity at which the tapes will drive by the capstans. The provision of separate, identical vacuum systems for the drive blocks in each bay 12, therefore, assures uniform tape drive characteristics, regardless of whether one of the bays 12 is used simultaneously with the other to transfer information from one cartridge to the other or whether one of the bays is used by itself while the other remains idle.

To position the tape loops accurately during passage over the head modules 42, a guide trough 118 having a pair of arcuate surfaces 120 is provided in each of the drive blocks 28 and 30. To assure proper lateral positioning of the tape on the surfaces 120, tape spacing blocks 122 are provided. Because the position assumed by the guide trough 118 during operation would cause the spacers 122 to interfere with the placement of tapes between the drive blocks and the head assembly 40, the guide troughs 118 are retractable. To this end, the guide troughs 118 are supported on a mounting plate 124 in turn carried on a shaft 126 supported in a linear bearing 128. The bearing 128 in turn is secured in an accurately machined bearing block 130 clamped within an appropriately formed well in the drive block. Retraction of the guide trough 118 is effected by a spring 132 acting on a shouldered nut 134 threadably secured at the outer end of the shaft 126. To advance the guide troughs 118 into the operative position as shown in FIG. 4 of the drawings, one or more inflatable bags 136 are positioned in back of the guide trough mounting plate 124 to be supplied with air from a suitable passage such as the duct 92 which also supplies air to the turn-around 74. Hence, it will be appreciated that the cartridges and thus the tapes 82 therein may be moved into position relative to the head assembly 40 and the drive blocks 28 without air being supplied to the chamber 90 or the duct 92 or evacuated from the chamber 104 so that the guide troughs 118 will be retracted by the spring 132. Then, when the passage 92 is connected to a source of pressure, the air bag 136 inflates to move the guide trough 118 against the bias of spring 132 into its operative position as governed by the base of the nut 134 engaging the end of the linear bearing 128.

Figure 7:
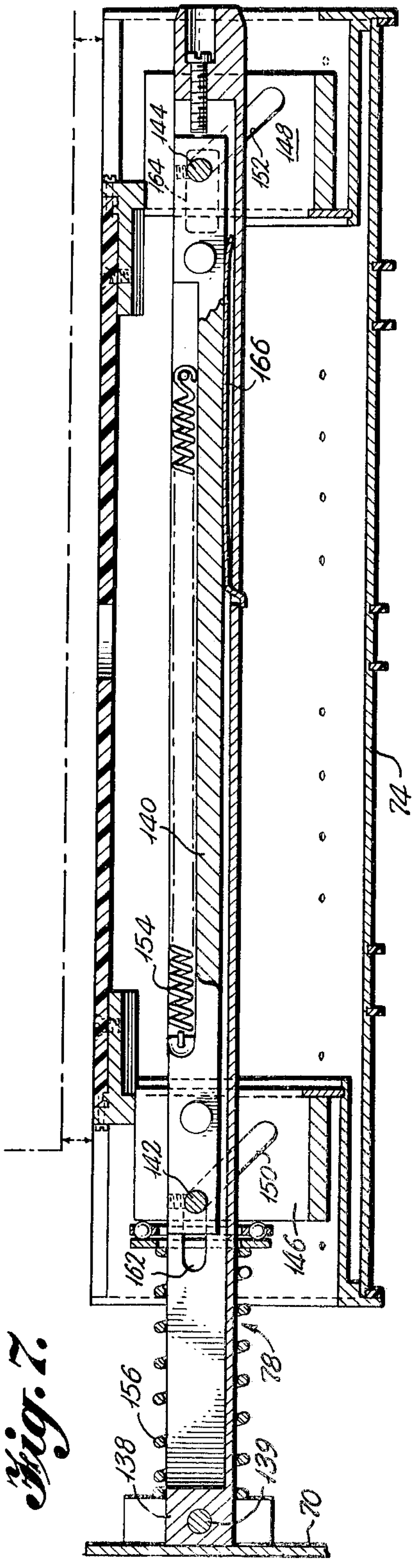
FIG. 7 is a cross-section illustrating a tape loop carrier or turn-around employed in the cartridge illustrated in FIGS. 4–6.
Figure 8:
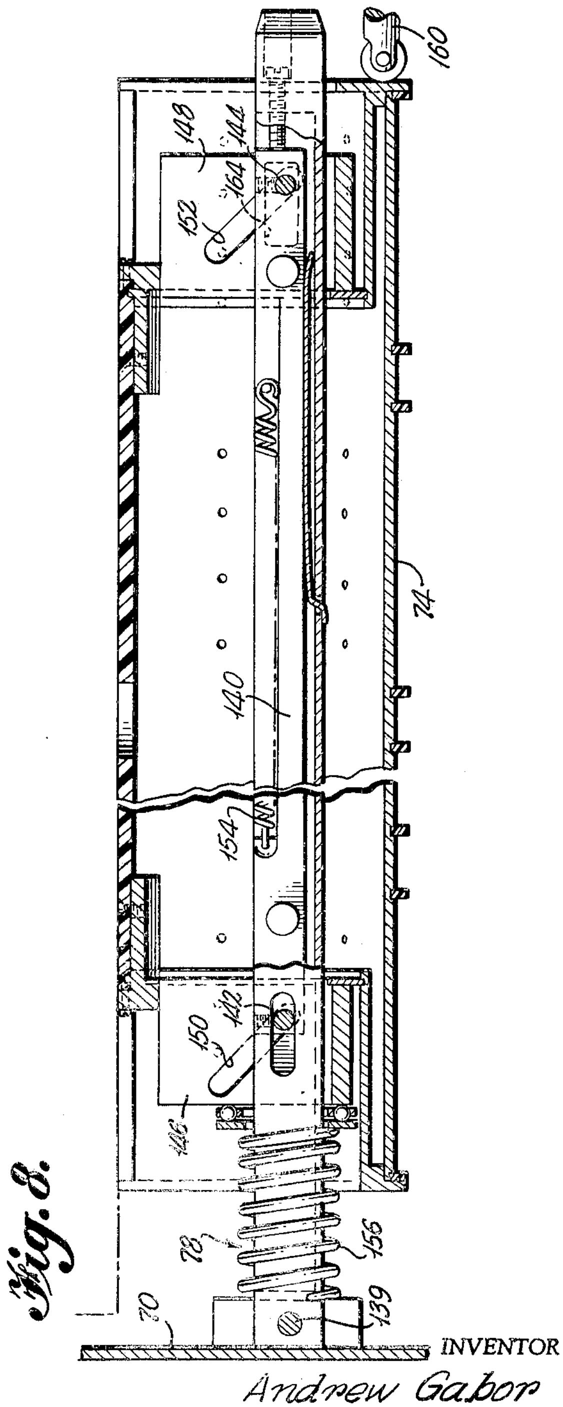
FIG. 8 is a cross-section of the turn-around illustrated in FIG. 7 but in a different operative position.

The manner in which the turn-arounds are supported in the cartridges 32 and moved against the upper and lower surfaces of the drive blocks 28 and 30 may be understood by reference to FIGS. 7 and 8 of the drawings. As above mentioned, the turn-arounds 72 and 74 are similarly supported on identical rod assemblies 76 and 78 cantilevered from the rear wall 70 of the cartridge. The rod assembly for each of the turn-arounds includes a channel-shaped mounting bar 138 cantilevered from the rear wall 70 by a mounting pin 139, a tie bar 140 slidably received within the channel-shaped mounting bar and carrying a pair of roller bearing pins 142 and 144, and a pair of cam blocks 146 and 148 having inclined slots 150 and 152 for receiving the ball bearing pins 142 and 144 respectively. The cam blocks 146 and 148 are fixedly secured to the rear and front ends of each turn-around, respectively. The tie bar 140 is connected to the channel-shaped mounting bar 138 by a relatively strong override spring 154. A relatively light return spring 156 biases the turn-around forwardly in the cartridge so that coaction between the inclined cam slots 150 and 152 and the ball bearing pins 142 and 144 operates to cam the lower turn-around 74 downwardly and the upper turn-around 72 upwardly to apply a slight tension to the tape loops trained about the turn-arounds. This condition is maintained at all times during storage of the cartridges.

As shown in FIG. 1 of the drawings, upper and lower pairs of fingers 158 and 160 project from the apron 24 to engage the front end of each turn-around as the cartridge moves into its operative position relative to the drive blocks 28 and 30 and the transducing head assembly 40. Therefore, as the cartridges 32 are fed toward the apron 24, the fingers 158 and 160 engage the front of the upper and lower turn-arounds 72 and 74 to limit further inward movement of the turn-arounds. As the cartridge continues to advance towards the apron, the relatively weak compression spring 156 is compressed and the resulting relative movement between the turn-arounds and the mounting bar assembly causes the turn-arounds to ride vertically toward one another on the ball bearing pins 142 and 144 until they engage the respective planar surfaces on the drive blocks. In the event more relative horizontal movement occurs between the turn-arounds and the mounting assembly than is necessary to seat the turn-arounds on the drive block surfaces, the override spring 154 permits the tie bar 140 to move relative to the channel-shaped mounting bar 138. Also, it will be noted that the rear pin 142 which is carried by the tie bar 140 rides in slots 162 formed in the walls of the channel-shaped mounting bar 138 and having a width only slightly larger than the diameter of the pin 142. The front or forwardly disposed pin 144 rides in slots 164 having a width significantly greater than the diameter of the pin 144. Also it will be noted that the upper edge of the slots 164 is elevated relative to the upper edge of the slot 162 and that a bow spring 166 biases the tie bar upwardly relative to the front end of the channel bar. Because of this arrangement, the turn-arounds are arranged in a slightly converging position relative to the direction of feed for the purpose of compensating for the force couple that develops as a result of the fingers 158 and 160 being disposed on an axis offset from the axis of the rod assembly 78. The force couple, in other words, corrects the intensional convergence of the turn-arounds as they are moved against the planar surfaces on the top and bottom of the drive blocks.

Figure 9:
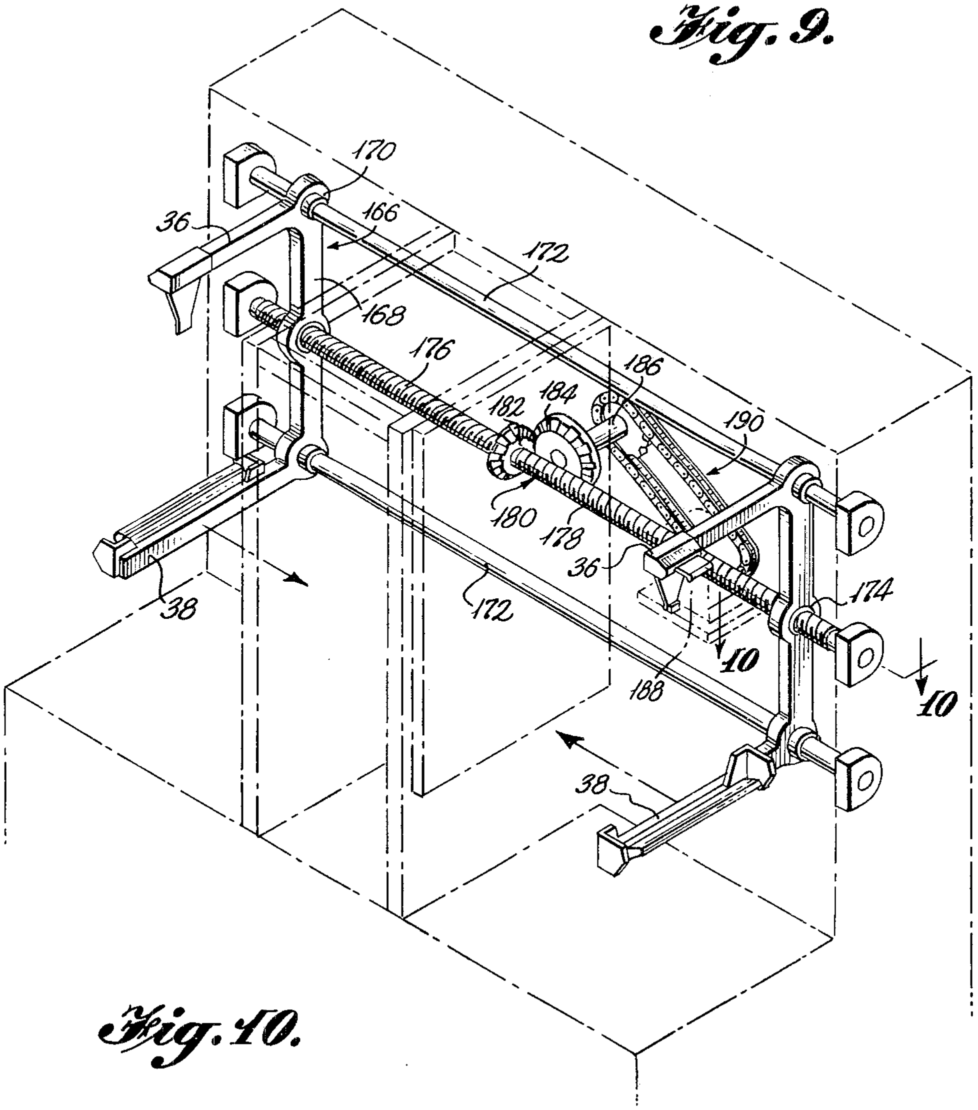
FIG. 9 is a fragmentary perspective view of the cartridge feed mechanism of this invention.
Figure 10:
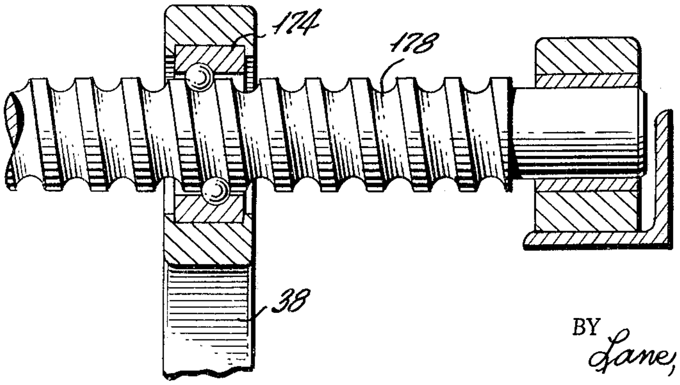
FIG. 10 is an enlarged fragmentary cross-section illustrating the details of the cartridge feed screw illustrated in FIG. 9.

As shown in FIGS. 9 and 10, the upper and lower cartridge supporting arms 36 and 38 in each bay 12 form part of a generally U-shaped cartridge carrier 166 having a vertical base portion 168. The upper and lower ends of the base portion of each carrier are provided with linear bearings 170, in turn received on parallel horizontal rods 172 fixed in the chassis 10. The central portion of each of the base portions 168 receives a ball bearing nut member 172 (FIG. 10) for engaging oppositely pitched threads 176 and 178 on a feed screw 180. A bevel gear 182 is keyed to the feed screw 180 at the center thereof, or between the oppositely pitched threads 176 and 178, and engages a further bevel gear 184 mounted on a drive shaft 186 to be driven by an electric motor 188 through a chain and sprocket assembly 190. The motor 188 is controlled by appropriate limit switch circuitry (not shown) to effect automatic control of the cartridge feed mechanism.

Figure 11:
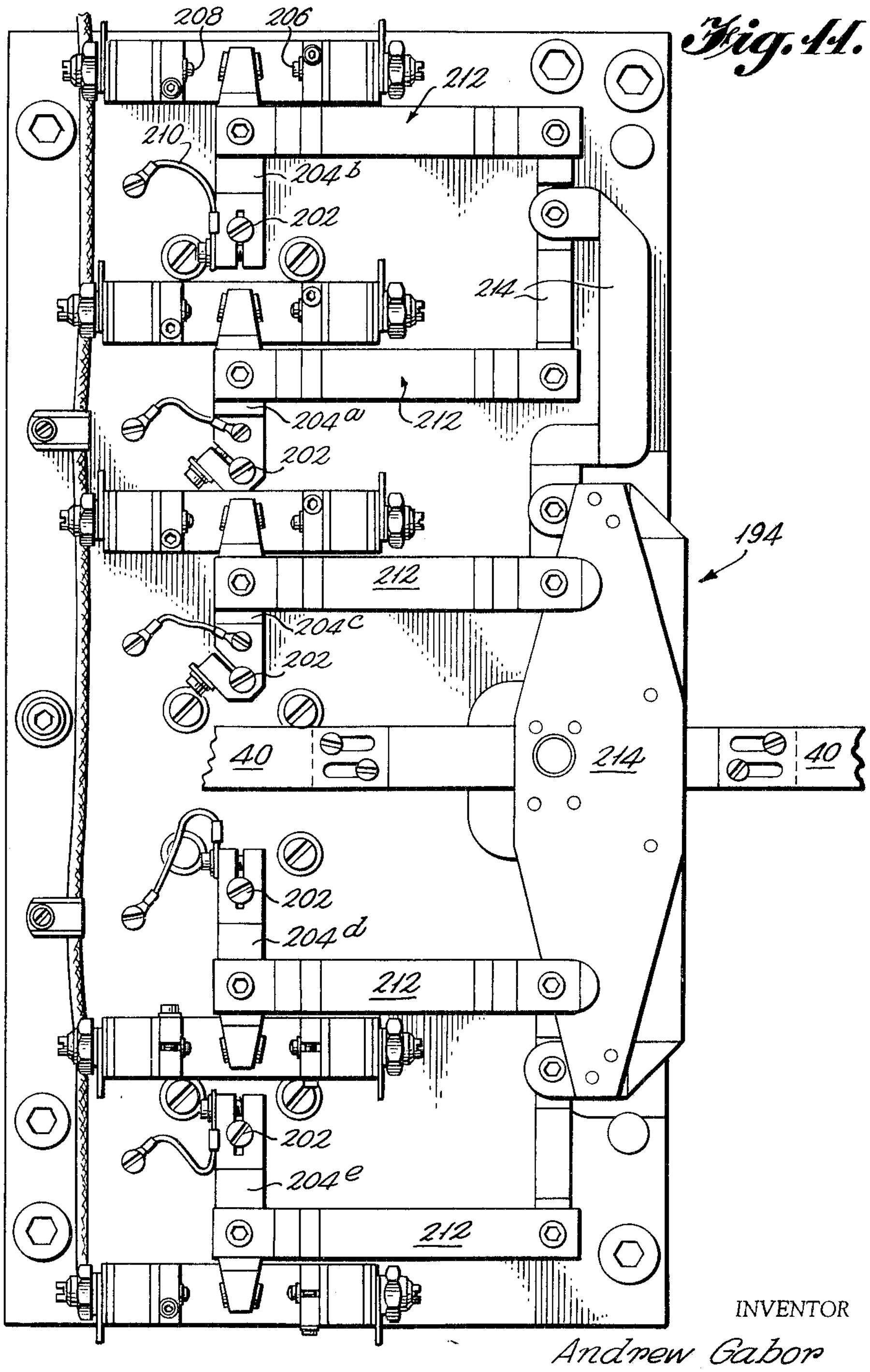
FIG. 11 is a plan view of the transducing head positioning means of the invention.

The construction of the head poistioning mechanism 22 is illustrated in the drawings most clearly in FIGS. 2 and 11–15. The positioning mechanism is generally supported on a plate 192 suspended between the walls 16. The mechanism includes a whiffletree assembly 194 supported on the upper surface of the plate driven by a plurality of two-way rotary solenoids, specifically five in the embodiment illustrated, each of the rotary solenoids being coupled to a dashpot 198 and balancing springs 200. As shown in FIG. 11, the whiffletree assembly is generally of the type disclosed in copending application Ser. No. 385,727, now patent No. 3,378,826, filed July 28, 1964 in that it includes a lever and linkage system by which precise positional increments can be established by movement of the respective two-way solenoids 196 between first and second positions. In the embodiment shown, the output or drive shafts 202 of the solenoids are fixed to cranks 204, **204*a*, 204*b*, 204*c*, 204*d* and 204*e*, respectively. The positions of each of the cranks 204*a*–204*e* is established by two stops 206 and 208, the stops being electrical conductors and functioning to complete homing circuits including flexible wires 210 connected to each of the cranks 204*a*–204*e*. The cranks 204 are connected through a series of pivotally interconnected links 212 and levers 214 to a transducing head coupling member 216 connected at opposite ends, respectively, to the ends of the transducing head assemblies 40 in both of the transducing bays 12. The connection of links 212 to the levers 214 is such that as the crank 204*a* moves between its respective stops 206 and 208, one increment of movement is transmitted to the transducing head assembly through the coupling member 216. Similarly, movement of the crank 204*b* between its stops 206 and 208 brings about two increments of the head movement; movement of the crank 204*c* effects four increments of movement; the crank 204*d* effects eight positional increments; and the crank 204*e* operates to establish twelve such increments. Considering as head position No. 1 the arrangement wherein each of the cranks 204 is moved against the stop 208, it will be appreciated that by appropriate programming of actuating the solenoids 196 between the respective stops, twenty-seven additional positional increments can be established to provide a total of twenty-eight precisely selected positions of the heads 44 and 46. Since four read and write heads are provided for each tape, the positioning device will enable the development of four times twenty-eight or 112** storage tracks on each tape.

Figure 12:
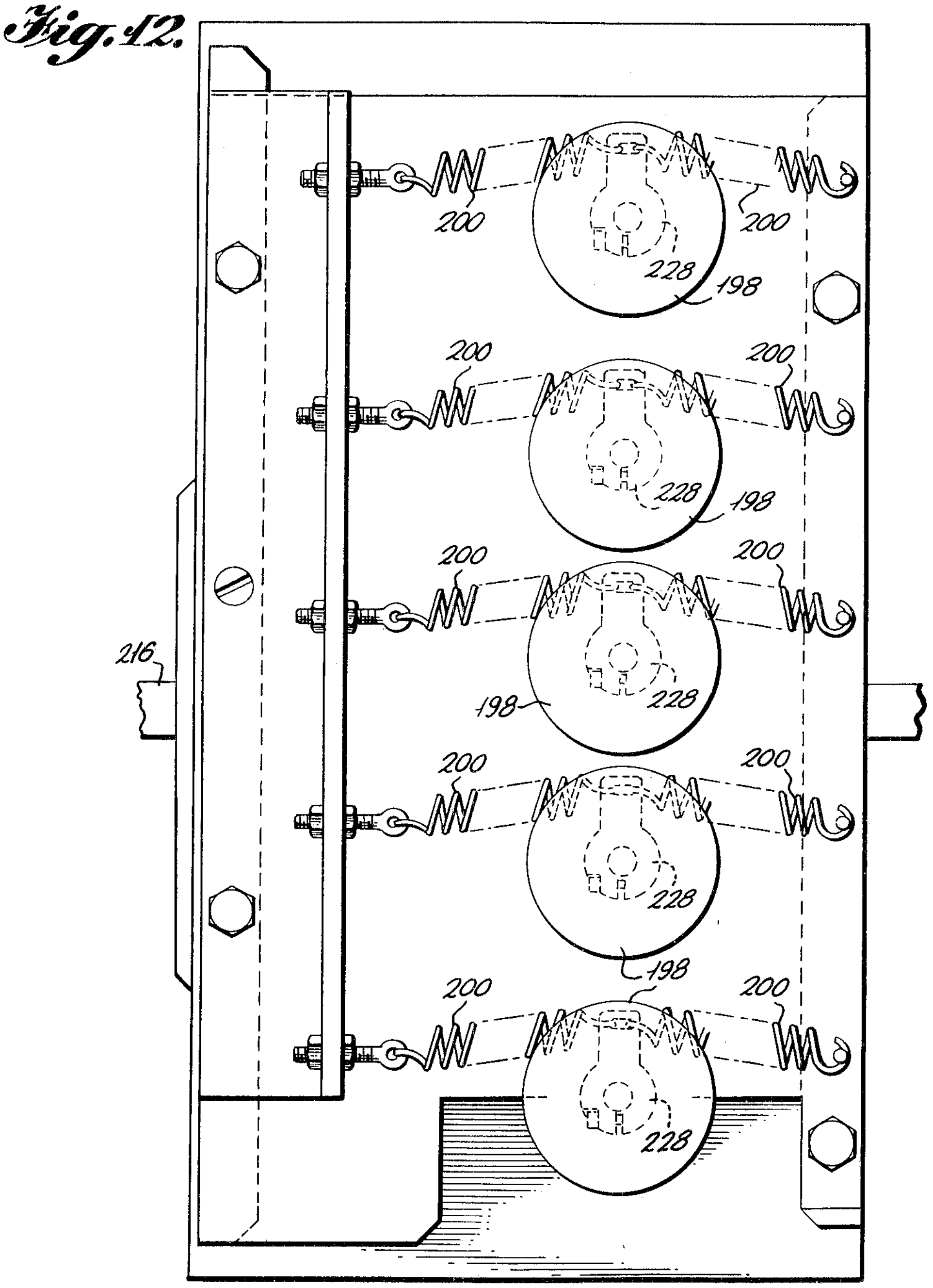
FIG. 12 is a bottom view looking up at the transducer head positioner of this invention.
Figure 13:
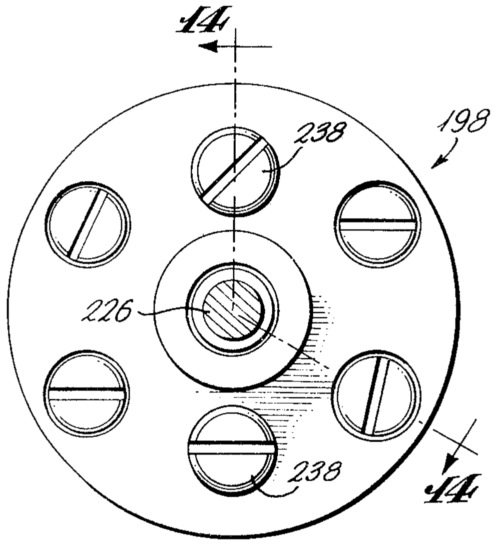
FIG. 13 is an end view of one form of dash pot to be used with the head positioning mechanism of this invention.
Figure 14:
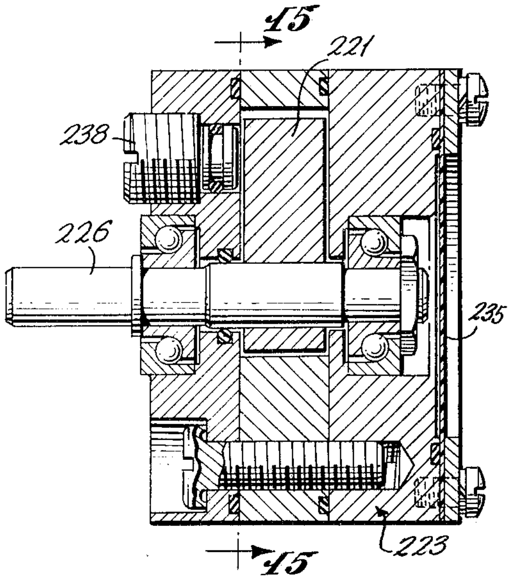
FIG. 14 is a cross-section taken on line 14—14 of FIG. 13.
Figure 15:
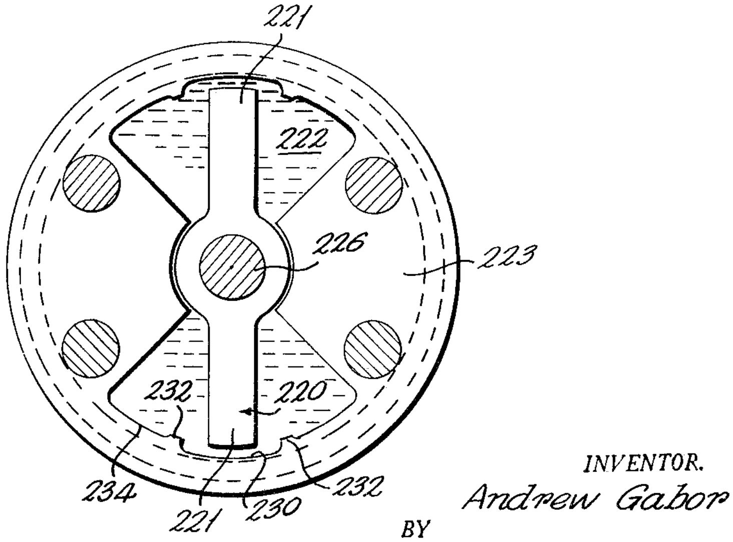
FIG. 15 is a cross-section taken on line 15—15 of FIG. 14.

The construction of one form of the dashpots 198 is shown in FIGS. 13–15 of the drawings. Each of the dashpots is the same and includes an impeller 220 having a pair of vanes 221 each operable in a closed fluid chamber 222 defined by a three-piece housing 223. The impeller 221 is fixed to a shaft 226, in turn coupled to the shaft 202 of one of the solenoids 196 by a coupling device 228. As shown in FIG. 12, the coupling units 226 are connected to the balancing springs 200 which function to offset the variation in magnetic attraction as the rotary solenoid moves in a manner to drive the cranks 204 between its respective stops 206 and 208. In other words, each set of springs 200 and solenoids 196 combine to exert substantially a constant force on the associated crank 204, regardless of the position of the crank between the stops 206 and 208.

As shown in FIG. 15, each of the chambers 22 is provided with a central arcuate section 230 positioned between a pair of inward projections 232 and a pair of further arcuate sections 234. Because of the difference in clearance between the ends of the impeller and the arcuate wall sections defining the chambers 222 the dashpots will operate to permit rapid traverse of the impeller and its associated parts between the projections 232 followed by a relatively slow movement after the impeller reaches the projections 232 due to the increased resistance to fluid flow from one side of the impeller to the other.

The form of damper illustrated in FIGS. 13–15 includes appropriate seal means by which hydraulic fluid is retained within the chambers 222. Further, a diaphragm 235 to accommodate variations in fluid pressure within the housing 224 is provided together with adjustable plugs 238 by which the static pressure of fluid within the chambers 222 may be regulated.

The storage apparatus of this invention may be operated to perform transducing operations on the tapes 82 in either one or two of the cartridges 32. Where it is desired to perform transducing operations on the tapes in two cartridges 32, both cartridges are mounted simultaneously on the arms 36 and 38 of the cartridge feed mechanism when the arms are located in their outermost position or the position substantially as shown in FIG. 1 of the drawings. After proper manipulation of various control devices located on the control panel 18, the cartridge feed drive motor 188 is operated to rotate the feed screw 180 and move the arms 36 and 38 together with the cartridges 32 inwardly toward aprons 25. As above mentioned, limit switch circuitry (not shown) is arranged so that slightly before the cartridges 32 reach the "home" or operative transducing position, illustrated for example in FIG. 2 of the drawings, the circuitry associated with the electric carriage feed motor 188 changes the speed of the motor from high speed to a relatively low speed. Simultaneously, the vacuum pumps 113 and 114 are energized to produce a low vacuum to take up loop slack created by mechanical deflection of the turn-arounds 72 and 74 into the operation position against the upper and lower surfaces on the drive blocks 28 and 30. When the cartridges reach fully the "home" or operative transducing position, the vacuum pumps are operated to apply full vacuum to the chambers 104, and simultaneously, the air pump 110 is operated to supply air to the chambers 90 and ducts 92 in the drive blocks. Also at this time, the capstans 102 are rotated at driving speed so that the eight tapes in each of the cartridges 32 simultaneously develop full transducing velocity.

With the tapes in each of the cartridges travelling at transducing velocities past the transducing head modules 42, various operations may be performed. For example, selective ones of the write-heads 44 on one of the transducing head assemblies 40 may be energized, after proper positioning of that head assembly by the head positioning means 22, to record information on corresponding ones of the 112 tracks on each of the tapes. Similarly, selected ones of the read heads 46 may be enabled to read information from any of the tracks on the tapes.

When it is desired to transfer information directly from one of the cartridges 32 to the other of these cartridges, such as for example, when the tapes in each cartridge become worn and where it is desired to preserve the information recorded thereon, the read heads 46 in transducing relation with the cartridge from which information is desired to be transferred are enabled while corresponding ones of the write heads 44 in transducing relation with the tapes of the other cartridge are energized. By means of the transfer circuits 61, the information previously recorded on one of the cartridges is transferred directly so as to be substantially duplicated on a new cartridge.

If it is desired to perform transducing operations on only one cartridge 32, then that cartridge alone is mounted on the carriage arms 36 and 38 in one of the bays 12 and the loading procedure as above described repeated. In this situation, however, only one of the vacuum pumps 113 or 114 need be operated to create the same vacuum load on the single cartridge as would have been created had two cartridges been loaded.

Thus, it will be appreciated that by this invention, a significantly improved information storage apparatus is provided by which the specific objectives above mentioned, among others, are fulfilled. Since many changes may be made in the form of the invention described and illustrated, it is to be distinctly understood that the foregoing description is illustrative only, not limiting, and that the true spirit and scope of this invention be determined by reference to the accompanying claims.

The invention claimed is:

1. A random access memory for storing information in cartridges, each cartridge containing a plurality of storage tapes, each of the storage tapes in each of said cartridges defining a plurality of storage tracks, said memory comprising: a chassis, a pair of transducer head assemblies on said chassis, supporting means to mount a pair of cartridges simultaneously on said chassis, each in transducing relation to a different one of said head assemblies, and means to transfer information from the tapes of one cartridge of said pair to the tapes of the other of said pair of cartridges mounted simultaneously on said chassis, said memory further comprising means to select one of the storage tracks in at least one of said pair of cartridges and cause one of said transducer head assemblies to perform transducing operations on the selected track.

2. A random access memory for storing information in interchangeable cartridges, each cartridge containing a plurality of storage tapes, the storage tapes in each of said cartridges defining a set of storage tracks which correspond in position to the storage tracks in the rest of said cartridges, said memory comprising: a chassis, a pair of transducer head assemblies on said chassis, each of said assemblies including a plurality of transducer heads to register with storage tracks on the tapes, supporting means to mount any two of said cartridges simultaneously on said chassis, each in transducing relation to a different one of said transducing head assemblies, and means to register a transducing head of one of said assemblies with any selected one of a plurality of tracks in one of said two cartridges and to register simultaneously a transducing head of the other of said assemblies with a corresponding track in the other of said two cartridges, and means interconnecting the transducing heads of said assemblies to transfer information stored on the selected track of said one cartridge to the corresponding track of said other cartridge.

3. A random access memory for storing information in cartridges each containing a plurality of storage tapes, said memory comprising: a chassis, a pair of transducer head assemblies on said chassis, supporting means to mount a pair of cartridges simultaneously on said chassis, each in transducing relation to a different one of said head assemblies, at least one rotatable capstan on said chassis positioned to engage the tapes in each of said pair of cartridges, and pneumatic means for moving the tapes in said cartridges against said capstan to drive said tapes past said ahead assemblies, said pneumatic means including a separate power source for each of said cartridges.

4. A random access memory as recited in claim 1 wherein all of said cartridges can be interchangeably supported by said supporting means in transducing relationship with one of said transducing head assemblies.

5. A random access memory as recited in claim 1 wherein said tapes in each of said cartridges are endless tape loops.

6. A random access memory as recited in claim 1 wherein said means to select at least one of the storage tracks includes means to move one of said transducing head assemblies so that a transducing head thereof is registrable with different ones of the storage tracks in the corresponding one of the cartridges supported by said supporting means.

References Cited

UNITED STATES PATENTS

| | | | |
|---|---|---|---|
| 3,235,264 | 2/1966 | Mikrut | 179—100.2 |
| 3,315,816 | 4/1967 | Metzger | 340—174.1 |
| 3,177,299 | 4/1965 | Smith | 179—100.2 |
| 3,126,162 | 3/1964 | Mackenzie | 179—100.2 |
| 2,918,656 | 12/1959 | Nolde et al. | 340—174.1 |
| 2,560,234 | 7/1951 | Masterson | 179—100.2 |

BERNARD KONICK, Primary Examiner

W. F. WHITE, Assistant Examiner

U.S. Cl. X.R.

179—100.2